Figure 7:
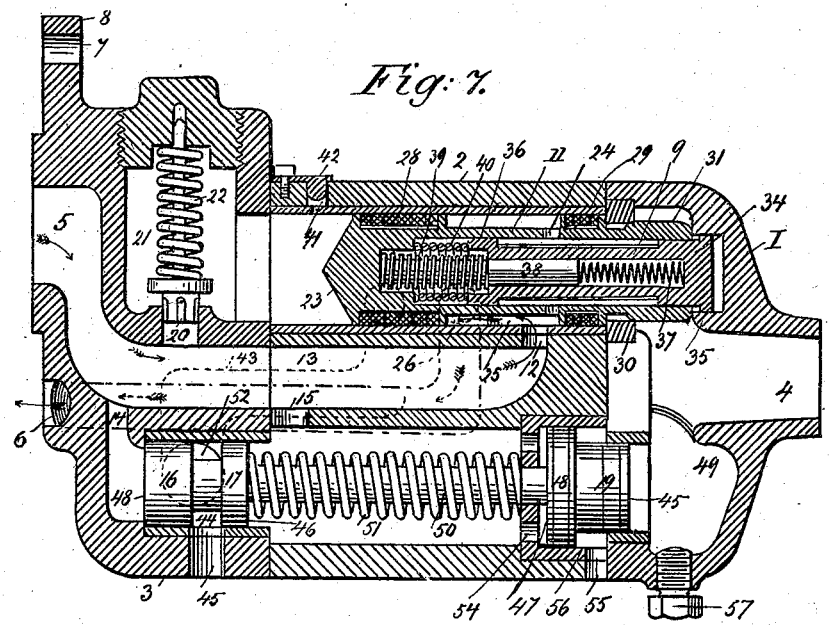

No. 858,954. PATENTED JULY 2, 1907.
S. CIRI.
MULTIPLE VALVE DEVICE FOR AIR BRAKES.
APPLICATION FILED SEPT. 18, 1906.
3 SHEETS—SHEET 1.
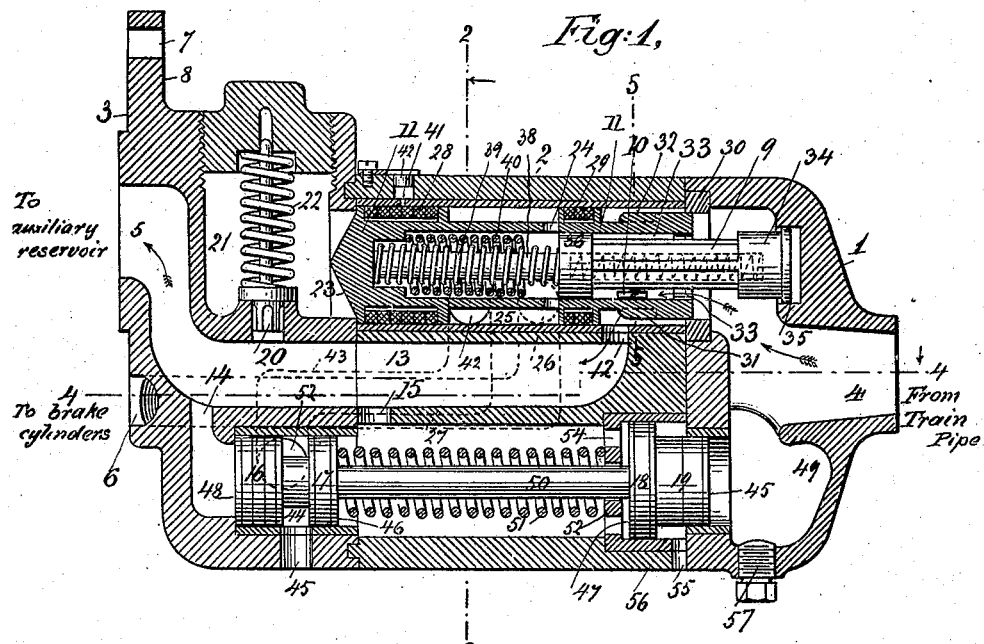
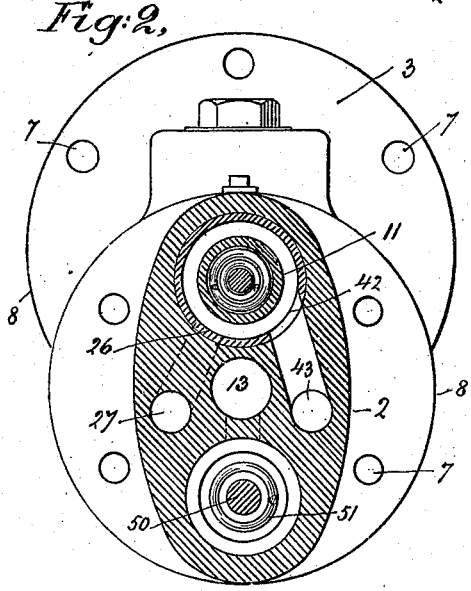
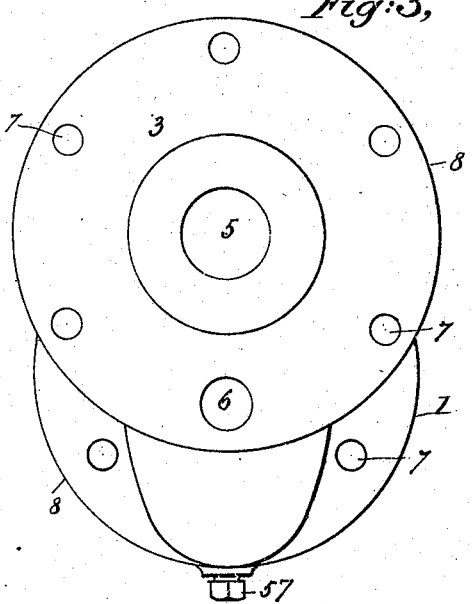
WITNESSES
INVENTOR
Silvio Ciri
BY
ATTORNEYS.

No. 858,954. PATENTED JULY 2, 1907.
S. CIRI.
MULTIPLE VALVE DEVICE FOR AIR BRAKES.
APPLICATION FILED SEPT. 18, 1906.
3 SHEETS—SHEET 2.
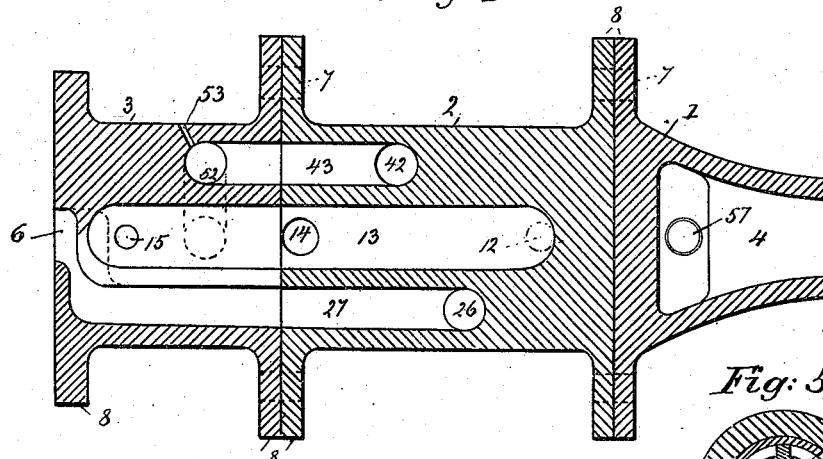
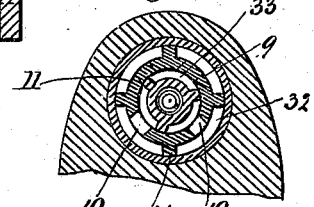
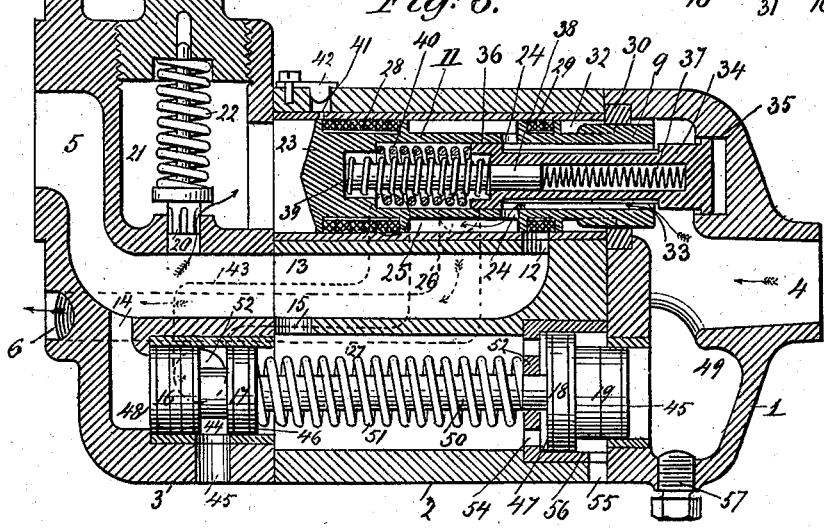
WITNESSES
INVENTOR
Silvio Ciri
BY
ATTORNEYS.

No. 858,954. PATENTED JULY 2, 1907.
S. CIRI.
MULTIPLE VALVE DEVICE FOR AIR BRAKES.
APPLICATION FILED SEPT. 18, 1906.

3 SHEETS—SHEET 3.

WITNESSES
INVENTOR
Silvio Ciri,
BY Edgar Tate & Co.
ATTORNEYS.

UNITED STATES PATENT OFFICE.

SILVIO CIRI, OF JERSEY CITY, NEW JERSEY, ASSIGNOR TO MICHAEL ANGELO LEONE, OF JERSEY CITY, NEW JERSEY.

MULTIPLE-VALVE DEVICE FOR AIR-BRAKES.

No. 858,954.        Specification of Letters Patent.        Patented July 2, 1907.

Application filed September 18, 1906. Serial No. 335,141.

*To all whom it may concern:*

Be it known that I, SILVIO CIRI, a subject of the King of Italy, and residing at Jersey City, in the county of Hudson and State of New Jersey, have invented certain new and useful Improvements in Multiple-Valve Devices for Air-Brakes, of which the following is a specification, such as will enable those skilled in the art to which it appertains to make and use the same.

This invention relates to pressure controlled air valves and is more particularly a multiple air brake valve and is designed to be used in connection with railway air-brake systems as a substitute for the present style of triple valves, and the object of this invention is to provide an improved device of this class which is controlled by the engineer's brake valve and which will instantly respond thereto, which is positive in action and according to the greater or lesser amount of air admitted into the same by the engineer will cause the brakes to be operated respectively by means of the air directly obtained from the air compressor through the train pipe or indirectly from the auxiliary reservoir, and which will when the brakes are not operated keep the auxiliary reservoir under the desired pressure, another object being to minimize the amount of expended air by exhausting solely from the multiple air brake valve when releasing the brakes, instead of from the brake cylinders, which object is obtained by partly returning the air from the brake cylinders to the multiple air brake valve, after which the air thus returned can again, together with the air taken from the auxiliary reservoir, be applied for successively operating the brakes.

In the drawings forming part of this specification, I have shown only my improved pressure controlled valve, it being understood that the said device is, in practice used in connection with the usual air brake mechanism, such as auxiliary reservoir, brake cylinders, air supply mechanism the latter usually installed on the locomotive and the different air conveying pipes necessary for devices of this class.

The invention is fully disclosed in the following specification, of which the accompanying drawings form a part, in which the separate parts of my improvements are designated by suitable reference characters in each of the views, and in which;—

Figure 8:
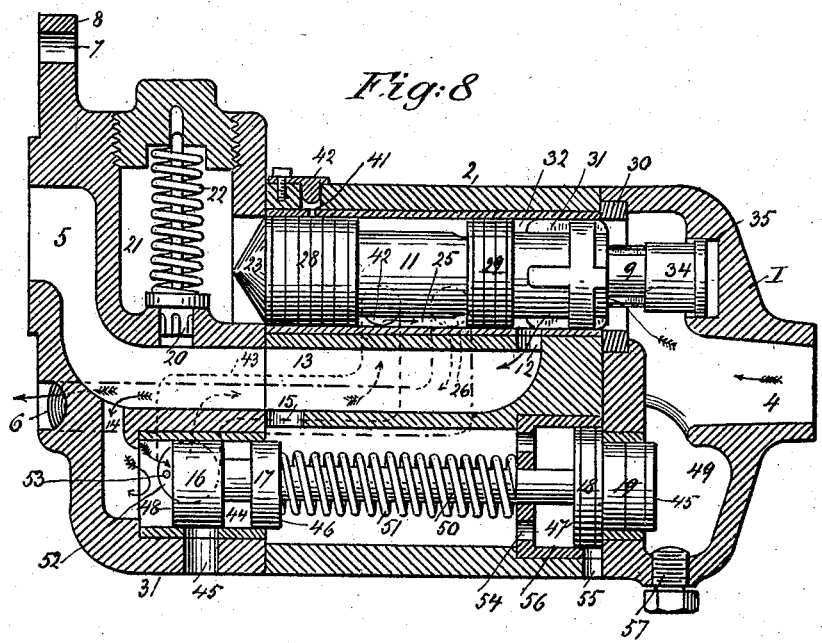

Figure 1 is a longitudinal vertical section of my improved pressure controlled air valve showing all the parts in their normal position, with the auxiliary reservoir and the train pipe in communication with each other, and with admission to the brake cylinders cut off; Fig. 2 a transverse section on the line 2—2 of Fig. 1; Fig. 3 an outside view of that end which communicates with the reservoir and brake cylinder; Fig. 4 a longitudinal horizontal section on the line 4—4 of Fig. 1; Fig. 5 a partial section on the line 5—5 of Fig. 1; Fig. 6 a view similar to Fig. 1 but showing the parts thereof in the position occupied when the train pipe and brake cylinder are placed in communication with each other; Fig. 7 a view similar to Fig. 6 illustrating an advanced position of the moving parts thereof, such as they attain when the auxiliary reservoir is brought into communication with the brake cylinder, and when direct or quick brake action is applied to the latter; Fig. 8 a view similar to Fig. 7 showing another advancement of the moving portions thereof and illustrating the position they occupy in which the air is free to pass directly from the train pipe to the brake cylinder and whereby a continuous moderate brake action is applied to the latter.

The valve casing is composite in its construction and consists of a front or admission end 1, a central body portion 2 and a rear end 3. The front end has at 4 an admission port to which the train pipe leading from the air compressor may be attached in any desired form, the rear end 3 has at 5 an outlet port by means of which communication can be made to the usual auxiliary reservoir, and it has also an outlet port 6 which is designed for conveying air to the brake cylinders not shown in the drawing. These three parts of the valve casing are united with each other by means of bolts which pass through bolt holes 7 in flanges 8, the rear end 3 of the same being also provided with a flange 8 for making connection with the reservoir and brake cylinders.

Referring to Fig. 1 of the drawing, in which the device is represented in its normal position with communication open between the admission port 4 and reservoir port 5, the air passes from 4 through the annular passage 33 in the ribbed hollow cylinder 9, through the ports 10 formed in the outer inclosing hollow piston cylinder 11 into the annular chamber 32 and through the port 12 into the longitudinally extending passage 13 to the auxiliary reservoir port 5, thereby maintaining equal pressure throughout between these several parts from the air compressor to the reservoir. Incidentally the air also passes through port 14 and through port 15 and keeps thereby the united pistons 16, 17, 18 and 19 in a balanced position as more particularly referred to hereafter. The air will also impinge against the valve 20, raise it from its seat as shown in Fig. 6 of the drawing and bring thereby the impulsion chamber 21 under reservoir pressure. This valve 20 is normally held seated by action of a compression spring 22 with its tension arranged so as to yield sufficiently to the reservoir pressure in order to admit the air to the chamber 21 but will cause the valve to be reseated when the pressure becomes reduced.

In order to apply the direct brake the pressure is slightly increased in the train pipe with the result of augmenting the pressure against the face 23 of the horizontally reciprocating hollow piston cylinder 11 by means of which the latter assumes the position as shown in Fig. 6, and whereby the port 12 becomes closed and the ports 24 in the hollow piston cylinder 11 become uncovered and thereby permit a flow of air to assume the direction from 4 to 33 through 24 into the annular chamber 25 where the air encounters the port opening 26, which leads into the longitudinal chamber 27 shown in dotted lines in Figs. 1 and 6, and thereby reaches the outlet port 6 to the brake cylinders. Communication between auxiliary reservoir, train pipe and cylinder brakes are thereby broken, leaving the auxiliary reservoir and the therewith connected passages and chambers in the air valve under increased reservoir pressure.

The release of the brakes is accomplished by reducing the train pipe pressure to normal pressure; this places the reservoir and brake pressure superior to the train pressure with the result, that such superior brake pressure will push the piston cylinder 11 further to the right and thereby uncover the vent 41, through which the air now will escape and thereby equalize the air on both ends of the piston. The various springs of the piston cylinder 11 will return the latter to the position shown in Fig. 1 of the drawing.

The piston cylinder 11 forms part of a combination telescopic piston valve shown in the different views, in which 11 represents a main outer hollow cylinder provided with packing rings 28, 29, the heretofore mentioned outer annular chamber 25, and a forwardly projecting ribbed head 9ᵃ having its bearing in the surrounding packing ring 30 as seen in Fig. 5, the piston head 9ᵃ is provided with outwardly projecting flanges 31 which provide the air passages 32. A secondary piston member 34 forms the other parts of the telescopic piston valve and is seated at 35 in the front end of the casing and at 36 in the interior of the hollow cylinder 11 and telescopes into the latter and is provided with an inner compression spring 37 which bears against the outer end of a plunger 38, which latter forms part of the main head 23 of the piston cylinder 11.

Two compression springs 39, 40 encircling the plunger 38 oppose telescopic action of the parts 11 and 34 by bearing against relatively opposed shoulders of either of these parts. The spring 39 is of lesser resistance than spring 40 and is brought into action prior to the stronger spring 40, which latter becomes effective when the different parts of this mechanism are brought into the position illustrated in Fig. 7.

In order to apply the indirect or quick brake or for the purpose of establishing communication between the auxiliary reservoir and the brake cylinders it becomes necessary to reduce somewhat the air pressure in the train pipe whereby the normal position of the mechanism as shown in Fig. 1 is changed to that as shown in Fig. 7 of the drawing, the greater reservoir pressure against the head 23 forces the hollow piston cylinder 11 and the inner piston 34 into closer telescopic position by overcoming the resistance of the combined springs 39 and 40, whereby communication is again broken between the train pipe and the brake cylinders and communication is established between the latter and the auxiliary reservoir. The position of the piston cylinder 11 is now such as to uncover the vent opening 41 which is normally held closed by the spring plug 42, and the air pressure in the impulsion chamber 21 will be rapidly diminished by reason of a partial escape of the air through said vent, the spring plug 41 having a resistance which is graded so as to stop the train within a predetermined time. The springs 39 and 40 will exert themselves against this reduced air pressure and bring the piston cylinder 11 back again into a position so as to cover the air vent 41, as is shown in Fig. 6 thereby putting the brake cylinder back into communication with the train pipe, with the result of letting the accumulated air in the brake cylinder partly return into the train pipe through passages 6, 26, and 33 after which, in consequence of the re-established pressure at 4 the piston cylinder 11 will be brought back into its original position as shown in Fig. 1. In this position the brake cylinders communicate with the atmosphere by means of ports 6, passages 27, port 26, annular chamber 25, port 42, passage 43, port 52, annular chamber 44 between piston heads 16 and 17 and exhaust port 45, while the train pipe again communicates with the auxiliary reservoir from 4 through 33, 12, 13 and 5. The air in the train pipe and reservoir is now of even but somewhat reduced pressure and requires to be restored again to the normal pressure by means of the air compressor.

In order to obtain a continuous moderate brake action it is necessary to augment the air pressure in the train pipe so as to sensibly surpass the normal pressure. In this event the lower horizontal reciprocating combined pistons 16, 17, 18 and 19 come into action where the air pressure exerted against the faces 45 and 46 keeps said pistons in their normal position, but with pressure exerted against the larger combined surface area of the faces 47 and 48 all the combined pistons are forced towards the forward chamber 49. A piston stem 50 unites these separate pistons and is provided with an encircling compression spring 51 which, bearing against the rigid partition 52 and the face 46 of piston 17, will facilitate the opposing air pressures until an increased air pressure from the train pipe overcomes its resistance. In this case the pistons move toward chamber 49 as shown in Fig. 8 of the drawings, and hereby communication is cut off between ports 52 and exhaust port 45, and free passage for the air is opened from port 14 to port 52, passage 43, port 42, annular chamber 25, port 26 to 6 and to brake cylinders, see Fig. 8. The operation to be attained by this sensibly increased train pressure differs from the heretofore decreased or slightly increased train pressure necessary for direct brake action in so far as to bring the lower pistons 16, 17, 18 and 19 into action as described above. These latter pistons under the previously described operation resists movements and are held in equilibrium by reason of the resisting action of the spring 15 being greater than the impelling action of the air pressure applied to the various piston surfaces but under the sensibly increased train pressure as described above the impelling force of the air pressure will overcome the resisting force of the spring 15 and cause the pistons 16, 17, 18 and 19 to assume the position as shown in Fig. 8 of the drawing with the object of thereby attaining the operation necessary for a continuous brake action.

A vent opening 53 communicating with the atmosphere is provided, which on account of the steady air escape therefrom will allow the engineer to regulate the intensity of the brake pressure at will, and by means of which arrangement a continuous moderate brake action can be maintained. When the air from the compressor is shut off, the brakes automatically become released by reason of the reduction of air pressure produced partially by the exhaust vent opening 53 and afterwards partially from the main exhaust 45, as soon as pistons 16 and 17 have regained their normal positions.

Inlet openings 54 in the rigid partition 52 convey air against the face 47 of piston 18 and air vents 55 facilitate the movements of the piston 18 within its cylinder casing 56. The chamber 49 serves as a condense-water reservoir and is provided with the plug 57 for draw off purposes.

From the foregoing description it will be seen that the hollow piston cylinder 11 in connection with the secondary piston member 34 which telescopes therein together with the springs mounted in said parts and other features of construction thereof, form and operate as a combination telescopic piston valve which is placed in a corresponding cylinder, while the pistons 16, 17, 18 and 19 and connecting rod 50 form a double ended combination piston valve placed in another cylinder, the construction of the casing in which said cylinders are formed, the various connections of said casing, the various ports and passages by which said cylinders are placed in communication, and connection is made with the train pipe, auxiliary air reservoir and brake cylinder and the exhaust and drain ports making up the details of the device of which the piston valves form the main operative parts. It will thus be seen that by means of my improved multiple-air-valve, the engineer in charge of a train provided with the same and attached to the usual air brake mechanism will have the train under absolute control, being enabled thereby to apply the direct, the indirect and the moderate continuous brake by simply manipulating the engineer brake valve and regulate thereby the intensity of the applied air pressure with the subsequent results obtained thereby and as described in the foregoing description.

Having fully described my invention, what I claim as new and desire to secure by Letters Patent, is;—

1. A multiple air valve device of the class described used in connection with railway air brake apparatus, said device being designed to receive an initial air pressure from a source of supply and being adapted to be placed in communication with an auxiliary reservoir and with the brake cylinders and the thereto attached brake mechanism and provided with means for manipulating the latter through a regulated intensity of the air supply so as to enable the operator to apply at will a direct brake action, and a continuous moderate brake action by means of a supply of air carried thereto from the source of supply, and an indirect quick brake action by means of an air supply carried thereto from an auxiliary reservoir.

2. A multiple air valve device of the class described adapted for use in connection with railway brake apparatus and provided with two horizontally reciprocating valves actuated at will by regulating the air pressure supplied thereto, whereby the brakes can be applied either by means of pressure taken from the train pipe, or from an auxiliary reservoir in accordance with the increased or decreased air supply initially applied by means of the train pipe.

3. A multiple air valve device of the class described for use in connection with railway air brake apparatus, said device comprising a casing provided at one end with a train pipe connection and at the opposite end with auxiliary air reservoir and brake cylinder connections, said device being also provided with means for manipulating the brake mechanism by regulating the air supply in the train pipe so as to enable the operator to apply at will a direct brake action, a continuous moderate brake action and an indirect quick brake action, the indirect brake action being accomplished by a reduction of pressure in the train pipe, and the direct brake action and continuous moderate brake action being accomplished by an increase of pressure in the train pipe.

4. A multiple air valve device of the class described adapted for use in connection with railway brake apparatus, said device comprising a casing provided at one end with a train pipe connection and at the opposite end with auxiliary air reservoir and brake cylinder connections, said casing being also provided with two horizontally reciprocating valves actuated at will by regulating the air pressure supplied through the train pipe, whereby the brakes can be applied either by means of pressure taken from the train pipe or from an auxiliary reservoir, both of said operations being under the control of the engineer and being effected by an increase or decrease of pressure in the train pipe.

5. A multiple air valve device of the class described for use in connection with railway air brake apparatus, said device comprising a casing provided at one end with a train pipe connection and at the opposite end with auxiliary reservoir and brake cylinder connections, said casing being provided with two reciprocating piston valves operated by air pressure supplied through the train pipe and under the control of the engineer, or by pressure from an auxiliary reservoir also under the control of the engineer, and means whereby the air supply to the brake devices after the latter have performed their functions is returned automatically to the air valve device and train pipe.

6. A multiple air valve device of the class described for use in connection with railway air brake apparatus and comprising a casing provided at one end with a train pipe connection and at the opposite end with auxiliary air reservoir and brake cylinder connections, and means for manipulating the brake mechanism by regulation of the intensity of the air supply through the train pipe so as to enable the operator to control at will the operation of the brakes.

7. A multiple air valve device of the class described designed for use in connection with railway air brake apparatus, said device comprising a casing provided at one end with a train pipe connection and at the opposite end with auxiliary air reservoir and brake cylinder connections, said casing being also provided with two longitudinally arranged reciprocating piston valves mounted in corresponding cylinders and with a central longitudinal chamber which opens through the auxiliary air reservoir connection, and ports or passages placing said cylinders and said chamber in communication, one of said cylinders in communication with the brake cylinder connection and with the train pipe connection, and means whereby the operation of the said valves is controlled by the pressure of air supplied through the train pipe at the will of the engineer.

8. A multiple air valve device for use in connection with railway air brake apparatus and as a part thereof, said device comprising a casing provided at one end with a train pipe connection and at the opposite end with auxiliary air reservoir and brake cylinder connections, said casing being also provided with two longitudinally reciprocating piston valves mounted in corresponding cylinders one of which is in communication with the train pipe connection, a central longitudinal chamber which is in communication with the auxiliary air reservoir connection, and ports or passages forming communications between both of said cylinders and said chamber and between one of said cylinders and the brake cylinder connection, the cylinder which is in communication with the train pipe connection being also in communication opposite to said connection with said central longitudinal chamber which communication is controlled by a spring operated valve.

9. A multiple air valve device for use in connection with railway air brake apparatus, said device comprising a casing provided with a train pipe connection and auxiliary air reservoir and brake cylinder connections, said casing being also provided with two longitudinally movable piston valves mounted in corresponding cylinders one of which is in communication with the train pipe connection and with a central longitudinal chamber in communication with the auxiliary air reservoir connection, ports or passages forming a communication between said cylinders and the central longitudinal chamber and between one of said cylinders and the brake cylinder connection, and said casing being also provided with exhaust and drain ports or passages.

10. A multiple air valve device of the class described designed for use in connection with railway air brake apparatus and comprising a casing provided at one end with a train pipe connection and at the opposite end with auxiliary air reservoir and brake cylinder connections, a plurality of piston valves movable longitudinally in said casing and in corresponding cylinders formed therein, one of said cylinders being in communication with the train pipe connection, said casing being also provided with a longitudinal chamber in communication with the auxiliary air reservoir connection, and ports or passages forming a communication between the said cylinders and the said central chamber and between one of said cylinders and the brake cylinder connection, and means involving the construction of said piston valves whereby the engineer may by controlling the pressure in the train pipe apply a direct brake action, a continuous moderate brake action, or an indirect quick brake action.

11. A multiple air valve device for use in connection with railway air brake apparatus, said device comprising a casing provided with a train pipe connection and auxiliary air reservoir and brake cylinder connections, said casing being also provided with two longitudinally movable piston valves mounted in corresponding cylinders, one of which is in communication at one end with the train pipe connection, a central longitudinal chamber in communication at one end with the auxiliary air reservoir connection, ports or passages forming communications between both of said cylinders and said central chamber and between one of said cylinders and the brake cylinder connection, and means involving the construction of said piston valves whereby the engineer by controlling the pressure of air in the train pipe may control the operation of the brakes.

12. A multiple air valve device for use in connection with railway air brake apparatus, said device comprising a casing provided with two longitudinally movable piston valves and provided at one end with a train pipe connection and at the opposite end with auxiliary air reservoir and brake cylinder connections, and means involving the construction of said valves whereby the engineer may control the operation of the brakes by controlling the air pressure in the train pipe.

13. A multiple air valve device for use in connection with railway air brake apparatus, said device comprising a casing provided with two longitudinally movable piston valves and provided at one end with a train pipe connection and at the opposite end with auxiliary air reservoir and brake cylinder connections, and means involving the construction of said valves whereby the engineer may control the operation of the brakes by controlling the air pressure in the train pipe so as to produce at will a direct brake action, a continuous brake action, or an indirect quick brake action.

14. A multiple air valve device for use in connection with railway air brake apparatus, said devices comprising a casing provided with a train pipe connection, an auxiliary air reservoir connection, and a brake cylinder connection, said casing being also provided with a central longitudinal chamber in communication with the auxiliary air reservoir connection and with two longitudinally reciprocating piston valves mounted in corresponding chambers one of which is in direct communication with the train pipe connection, and means involving the construction of the piston valves whereby the application of the brakes may be controlled by the engineer by regulating the pressure in the train pipe connection.

15. A multiple air valve device for use in connection with railway air brake apparatus, comprising a casing having connections for a train pipe, an auxiliary air reservoir and a brake cylinder, said casing being also provided with two longitudinally movable piston valves, and means involving the construction of said valves whereby the operation of the brakes may be regulated by controlling the air pressure in the train pipe.

16. A multiple air valve device for use in connection with railway air brake apparatus, comprising a casing provided with a train pipe connection, an auxiliary air reservoir connection and a brake cylinder connection, said casing being also provided with two longitudinally movable piston valves mounted in corresponding cylinders, one of which is in communication at one end with the train pipe connection, a central longitudinal chamber in communication with the auxiliary air reservoir connection, ports or passages forming a communication between said central longitudinal chamber and both ends of the cylinder which is in communication with the train pipe connection, a spring operated valve controlling the communication at one end of said cylinder with said central longitudinal chamber, a port or passage forming a communication between one end of the other cylinder and with the chamber which is in communication with the auxiliary air reservoir connection, another port or passage forming a communication between the cylinder which is in communication with the train pipe connection and the brake cylinder connection, other ports or passages forming communications between both of said cylinders and the central longitudinal chamber, and means involving the construction of said piston valves whereby the engineer is enabled to control the operation of the brakes by controlling the pressure of air in the train pipe.

17. A multiple air valve device for use in connection with railway air brake apparatus, said device comprising a casing provided at one end with a train pipe connection and at the opposite end with auxiliary air reservoir and brake cylinder connections, said casing being also provided with a central longitudinal chamber in communication at one end with the auxiliary air reservoir connection, and two longitudinally movable piston valves mounted in corresponding cylinders one of which is in communication at one end with the train pipe connection and at the opposite end with a central longitudinal chamber, said last named communication being controlled by a spring operated valve, the cylinder which is in communication with the train pipe connection being also provided adjacent to the train pipe connection with a port or passage which communicates with the central longitudinal chamber and with another ports or passage which communicates with the brake cylinder connection, and with another port or passage forming a communication with the other cylinder, said last named cylinder being also in communication centrally thereof with the central longitudinal chamber, at the end thereof adjacent to the connection of the auxiliary air reservoir with another port or passage in communication with said central longitudinal chamber, and means involving the construction of said piston valves whereby the operation of the brakes is controlled by the engineer by controlling the pressure of air in the train pipe.

18. A multiple air valve device for use in connection with railway air brake apparatus, said device comprising a casing provided at one end with a train pipe connection and at the opposite end with auxiliary air reservoir and brake cylinder connections, a central longitudinal chamber which opens at one end through the auxiliary air reservoir connection, two longitudinally arranged cylinders one of which is in communication at one end with the train pipe connection and at both ends with the central longitudinal chamber, one of the last named communications adjacent to the auxiliary air reservoir connection being controlled by a spring operated valve, a port or passage forming a communication between the said cylinders, a port or passage forming a communication between the cylinder which is in communication with the train pipe connection and the brake cylinder connection, the other of said cylinders being provided with two ports or passages communication with the central longitudinal chamber, piston valves movable longitudinally in said cylinders and means involving the construction of said piston valves whereby the application of the brakes is controlled by the regulation of air pressure in the train pipe.

19. In a device of the class described, a combination telescopic piston valve composed of a main outer casing having an annular chamber in the outer wall thereof and a secondary piston member which telescopes thereinto, said main outer casing being provided with a plunger which telescopes in the supplemental piston member, and said supplemental piston member being provided with an annular reduction forming an annular chamber between said parts, and the outer casing being provided with ports or passages which communicate with said chamber, and a compression spring placed between the end of said plunger and the outer end of the supplemental piston member, and two compression springs of different resistances placed between the inner end of the supplemental member and the corresponding end of the main outer casing.

20. A multiple air valve device for use in connection with railway air brake apparatus, said device being provided at one end with a connection for a train pipe and at the opposite end with connections for an auxiliary reservoir and a brake cylinder, said device being also provided with a plurality of reciprocating piston valves and being provided with means for manipulating the brake mechanism through a regulated intensity of the air supply so as to enable the operator to apply at will a direct brake action, a continuous brake action and an indirect brake action.

21. A multiple air valve device for use in connection with railway air brake apparatus, said device being provided with a connection for a train pipe and connections for an auxiliary reservoir and a brake cylinder, and being also provided with reciprocating piston valves actuated by means of air pressure supplied at the will of the operator through a train pipe or from an auxiliary reservoir, and whereby the air supply to the brake mechanism after the latter has performed its function of setting the brakes is returned automatically to the air valve device and to the train pipe.

22. A multiple air valve device for use in connection with railway air brake apparatus, said device comprising a casing provided at one end with a train pipe connection and at the opposite end with auxiliary reservoir and brake cylinder connections; said device being also provided with reciprocating piston valves for manipulating the brake mechanism, said manipulation being effected by regulating the air supply in the train pipe so as to enable the operator to apply at will, a direct brake action, a continuous moderate brake action, and an indirect quick brake action.

23. A multiple air valve device for use in connection with railway air brake apparatus, said device comprising a casing provided at one end with a train pipe connection and at the opposite end with auxiliary reservoir and brake cylinder connections, said device being also provided with reciprocating piston valves for manipulating the brake mechanism, said manipulation being effected by regulating the air supply in the train pipe so as to enable the operator to apply at will a direct brake action, a continuous moderate brake action and an indirect quick brake action, the indirect quick brake action being accomplished by a reduction of pressure in the train pipe.

24. A multiple air valve device for use in connection with railway air brake apparatus, said device comprising a casing provided at one end with a train pipe connection and at the opposite end with auxiliary reservoir and brake cylinder connections, said casing being also provided with two horizontal reciprocating piston valves, means involving the construction of said valves for operating the brake mechanism, said operation being performed by regulating the air pressure in the train pipe.

In testimony that I claim the foregoing as my invention I have signed my name in presence of the subscribing witnesses this 17th day of September 1906.

SILVIO CIRI.

Witnesses:
 F. A. STEWART,
 C. E. MULREANY.